Patented Nov. 30, 1937

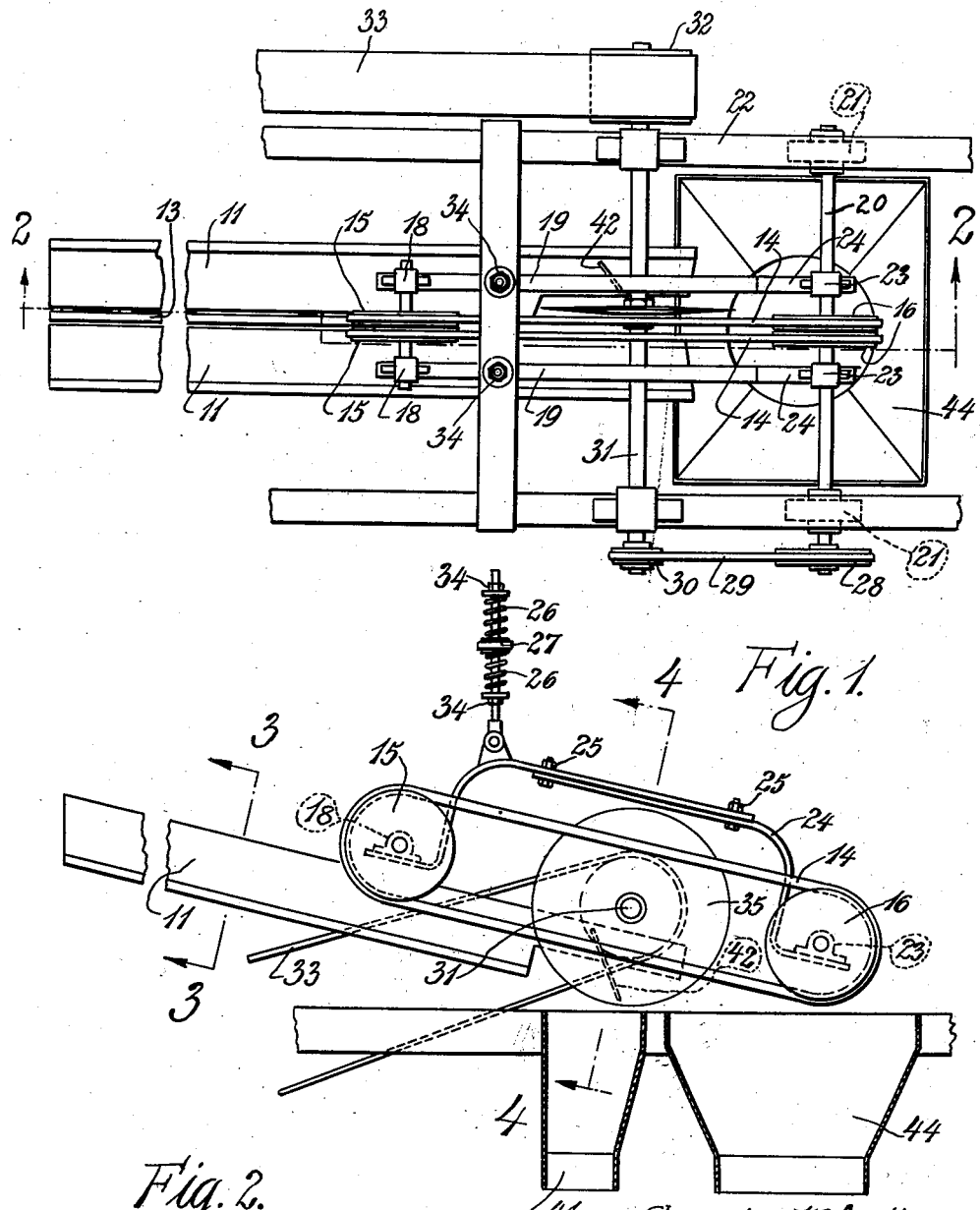

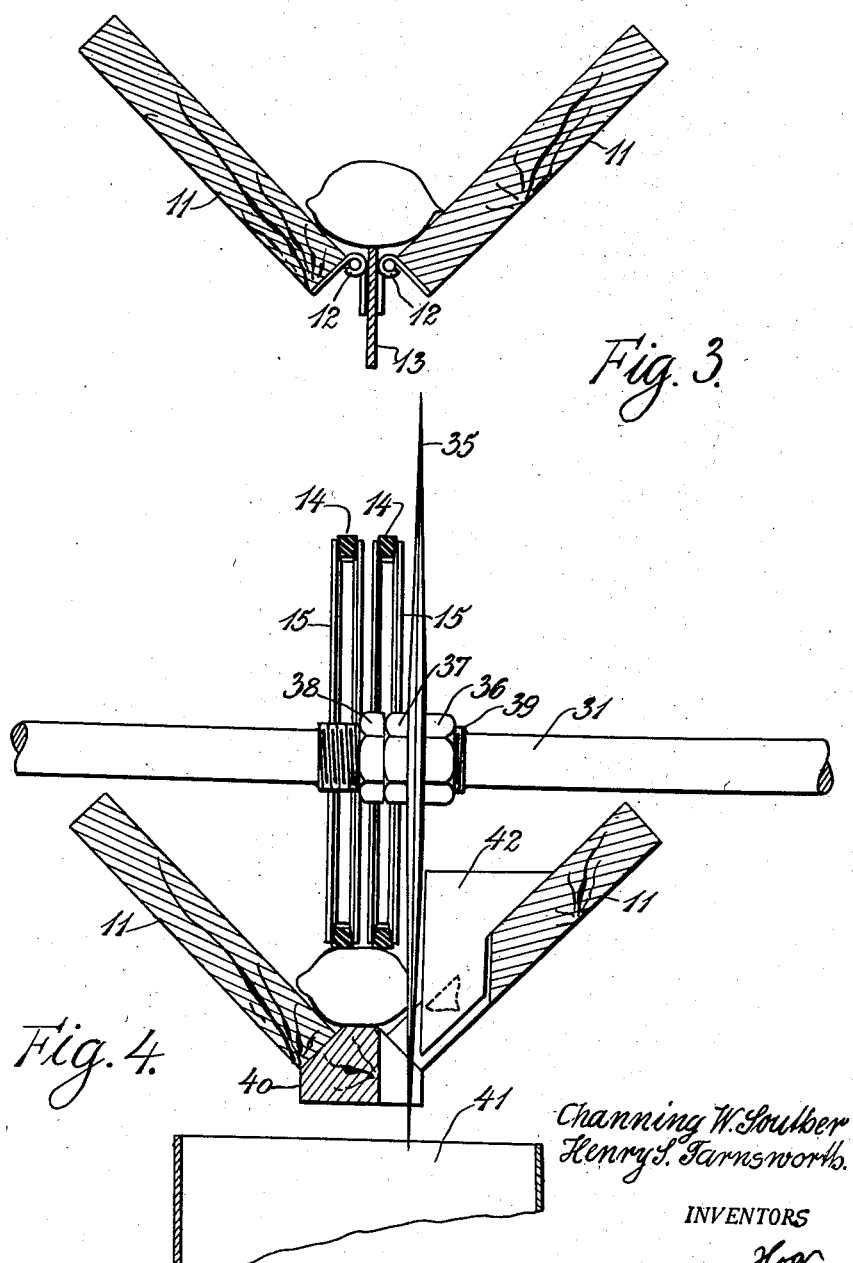

2,100,455

UNITED STATES PATENT OFFICE 2,100,455

FRUIT SPLITTER

Channing W. Souther, Laguna Beach, and Henry S. Farnsworth, Santa Ana, Calif., assignors to Natural Food Products Company, Orange, Calif., a corporation of Delaware Application April 29, 1936, Serial No. 76,998

7 Claims. (Cl. 146—73)

Our invention relates to new and useful improvements in fruit splitters, and chutes therefor; and more particularly to such devices for splitting citrus fruits preliminary to extracting their juice by means of burring.

In cutting citrus fruit for this purpose, on a commercial scale, it is desirable that the fruit be cut across its stem axis so that the burr-head may penetrate it along that axis. It is also desirable, especially with small fruit, that only a small part of one end be sliced off, the part so removed being principally rind, so that there shall be a minimum of wastage of juice in the part removed, and so that the remaining large portion may be reamed with a single operation instead of in two operations as must be done if the fruit is cut in approximately equal portions.

This style of cutting is particularly desirable with lemons. Small lemons, called lemonettes, are often available at prices below the price for ordinary commercial sizes, and the use of such lemonettes for commercial juice production may be economical. However, if they are cut in the conventional equal portions, the portions are too small to handle, the time and equipment required to extract commercial quantities of juice is excessive, and the expected economies are lost.

Hitherto there has been no positive way of causing citrus fruit to roll on the stem axis through a cutter so as to be cut uniformly. The usual practice is to roll citrus fruit down a V-trough in which a circular knife rotates, and manufacturers of such equipment have claimed that such rolling will cause 98% of the fruit to be cut across the stem axis. This may be true, if the fruit be slowly rolled down one by one; but in commercial practice the rolling fruit piles up on itself, and due to differences in sizes, weight, friction, etc., it tends to turn and twist. Furthermore, the fruit tends to ride from side to side of the trough, especially when put through at a high speed, and thus there can be no control over the point along its stem axis at which it is cut. Indeed, free rolling fruit which contact the knife off its center of gravity, will frequently turn in such a manner as to produce a small curved cut or just a nick. Furthermore, lemons of different sizes, because they are not even approximately spherical, will not roll truly down a fixed V-trough. To minimize frictional drag, a lemon or any fruit rolling in a V-trough will seek to adjust itself to a position where it makes contact with sides of the trough along two tracks on its own periphery which are of equal length. Gravity will cause the fruit to seek a position of lateral stability in seeking which it may ride to one side or the other of the trough and incline its stem axis considerably from the horizontal. The two forces, friction and gravity, seek equilibrium but vary constantly due to the irregular shape of the fruit. Theoretically, just as broad beam in a ship promotes stability, width between the peripheral tracks on the fruit would also tend to promote it, and a lemon would roll most evenly if supported at its two ends. But experimentation has shown that the increasing irregularities of shape which are found near the ends of lemons offset this stability, and that some lemons will roll down a trough end-over-end, taking peripheral tracks parallel with their stem axes.

Accordingly it is a principal object of our invention to provide a continuous fruit-splitter, which will cut practically all the fruit uniformly exactly at right angles to the principal axis of the fruit, in spite of any or all of the above hostile tendencies.

Other objects will appear as the description progresses.

Our invention consists in the novel steps, and in the novel parts, and in the combinations and arrangements thereof which are defined in the appended claims.

Throughout the description, the same reference number is applied to the same member or to similar members.

Figure 1 is a plan view of an apparatus embodying our invention.

Figure 2 is a side elevation, partly in section, of this same apparatus, taken along the lines 2—2 of Figure 1.

Figure 3 is a vertical section of this same apparatus, taken along the lines 3—3 of Figure 2.

Figure 4 is a vertical section of this same apparatus, taken along the lines 4—4, with the knife set for end-cutting.

Figure 5:
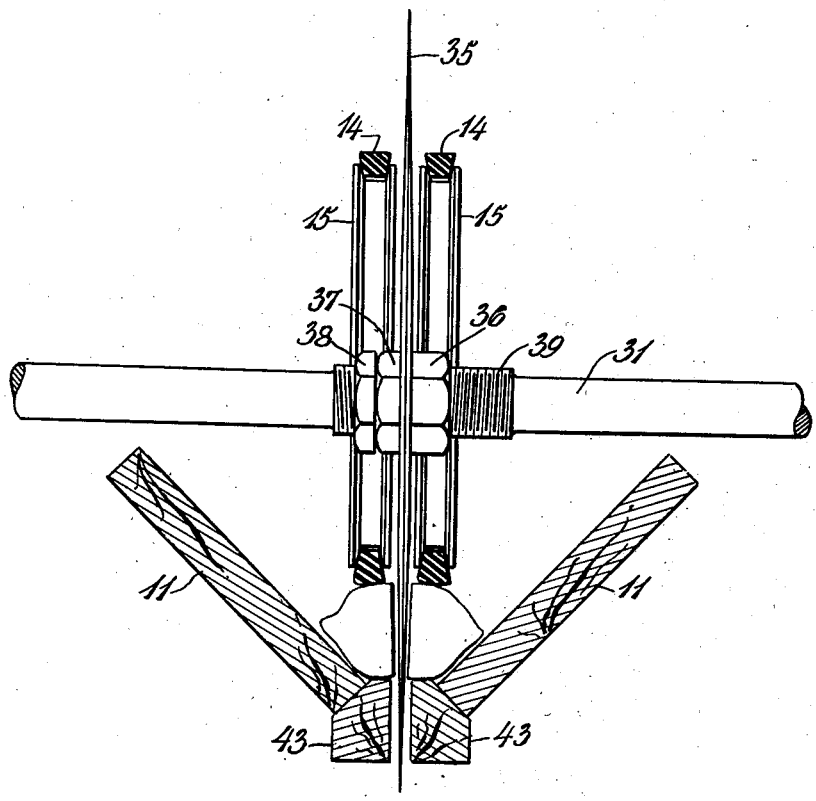
Figure 5 is a vertical section, corresponding to Figure 4, but with the knife set for center-cutting.

Referring to the drawings, we see that 11, 11 are sides of a V-shaped trough, adjustably hinged by hinges 12, 12 to a support 13. The sides, when adjusted, may be secured in that position in any appropriate manner, the details not forming a part of this present invention.

As a compromise between the theoretical desirability of supporting the fruit at the ends of its principal axis, and the practical difficulties introduced by the excessive irregularity of the ends of citrus fruit, the trough should be empirically adjusted until the ideal angularity be found.

By extending the support 13 up between the V sides of the trough, so as to constitute a ridge, this ridge will have the effect of knocking end-over-end-rolling fruit into such a position that the fruit will revolve substantially about its principal axis.

14, 14 are twin belts, preferably of the well-known V-belt type, carried by twin pulleys 15, 15 and 16, 16. Pulleys 15, 15 are mounted on a shaft 17, carried by bearings 18, 18 on brackets 19, 19. Pulleys 16, 16 are mounted on a shaft 20, carried by bearings 21, 21 on main frame 22, 22. This shaft 20 also passes through bearings 23, 23, on brackets 24, 24. Brackets 19, 19 are adjustably secured to brackets 24, 24, as by bolts 25, 25. Each bracket 19 is supported, by a pair of springs 26, 26, from a cross bar 27, carried by the main frame 22, 22.

Shaft 20 is driven by pulley 28, V-belt 29, pulley 30, shaft 31, pulley 32, and belt 33, from a power-source (not shown).

The speed of the belts 14, 14, which are driven in a downward direction, is adjusted so as to be just a little faster than the rate of downward roll of the fruit in the trough. The result is that the belts separate the fruit and keep them from jostling each other out of proper orientation. The pressure of the belts on the almost oriented fruit completes the proper orientation, so that they are carried onward rolling exactly on their principal axes.

The height of the belts above the trough can be adjusted by nuts 34, 34, to accommodate different sizes of fruit, and the springs 26, 26 permit automatic accommodation to slight variations of the fruit from standard.

Shaft 31 carries also revolving knife-blade 35, which is adjustable from side to side by means of nuts 36, 37 and 38 on threads 39.

The pulleys are shown thus adjusted slightly to one side in Figure 1. If desired, pulleys 15, 15 and 16, 16 may be sidewardly adjusted on their shafts in much the same manner.

Ridge 13 extends downwardly only about so far as pulleys 15. From there on it is supplanted by a table 40, for the fruit to roll upon, under pressure of the belts 14, 14.

When the knife is set for end-cutting, as in Figure 4, a part of right-hand side 11 and of the table 40 is cut away for the cut-off ends to drop through into chute 41, and a baffle 42 is provided to deflect the ends.

When, however, the knife is set for center-cutting, as in Figure 5, a double table 43, 43 is substituted; and preferably the baffle is omitted, and there is no gap in right-hand side 11.

This substitution can be effected in any convenient manner, the details of the substitution not forming a part of the present invention.

The major portion of the fruit in the device adjusted as in Figure 4, and both halves of the fruit in Figure 5 fall into chute 44.

Having now described and illustrated one form of our invention we wish it to be understood that our invention is not to be limited to the specific form or arrangements of parts hereinbefore described, except in so far as such limitations are specified in the appended claims.

We claim:—

1. A splitter for fruit having an elongated major axis, comprising: an inclined gravity feed chute having two side walls inclined at an angle to each other so as to form a V; means, in the bottom of the V, extending upwardly therein to form a ridge longitudinal of the chute, said ridge being in the more elevated portion of the chute; and a splitting knife mounted to operate lengthwise of the chute in the less elevated portion thereof.

2. A splitter for fruit having an elongated major axis, comprising: an inclined gravity feed chute having two side walls inclined at an angle to each other so as to form a V; means, in the bottom of the V, extending upwardly therein to form a ridge longitudinal of the chute, said ridge being in the more elevated portion of the chute; a rotary splitting knife mounted with its plane lengthwise of the chute in the less elevated portion thereof; and a fruit-supporting table adjacent the knife.

3. A splitter for fruit having an elongated major axis, comprising: an inclined gravity feed chute having two side walls inclined at an angle to each other so as to form a V; means, in the bottom of the V, extending upwardly therein to form a ridge longitudinal of the chute, said ridge being in the more elevated portion of the chute; and a laterally adjustable rotary splitting knife mounted to operate lengthwise of the chute in the less elevated portion thereof.

4. A splitter for fruit having an elongated major axis, comprising: an inclined gravity feed chute having two side walls inclined at an angle to each other so as to form a V; means, in the bottom of the V, extending upwardly therein to form a ridge longitudinal of the chute, said ridge being in the more elevated portion of the chute; a splitting knife mounted to operate lengthwise of the chute in the less elevated portion thereof; a fruit-supporting table adjacent the knife; twin belts, adjacent the knife, and arranged centrally and longitudinally of the chute, and above the same, to rollingly grip the fruit between the belts and the table, and thus carry it past the knife; and means for driving the belts.

5. A splitter for fruit having an elongated major axis, comprising: an inclined gravity feed chute having two side walls inclined at an angle to each other so as to form a V; means, in the bottom of the V, extending upwardly therein to form a ridge longitudinal of the chute, said ridge being in the more elevated portion of the chute; a splitting knife mounted to operate lengthwise of the chute in the less elevated portion thereof; a fruit-supporting table adjacent the knife; twin belts adjacent the knife, and arranged centrally and longitudinally of the chute, and above the same, to rollingly grip the fruit between the belts and the table, and thus carry it past the knife; and means for driving the belts; said belts being arranged so as to move at such a rate as to carry the fruit at a speed faster than the maximum rate of free rolling down the chute.

6. A splitter for fruit having an elongated major axis, comprising: an inclined gravity feed chute having two side walls inclined at an angle to each other so as to form a V; means, in the bottom of the V, extending upwardly therein to form a ridge longitudinal of the chute, said ridge being in the more elevated portion of the chute; a splitting knife mounted to operate lengthwise of the chute in the less elevated portion thereof; a fruit-supporting table adjacent the knife; twin belts adjacent the knife, and arranged centrally and longitudinally of the chute, and above the same, to rollingly grip the fruit between the belts and the table, and thus carry it past the knife; means for driving the belts; and adjustable resilient means supporting the belts.

7. A splitter for fruit comprising: an inclined gravity feed chute; a splitting knife mounted to operate lengthwise of the chute in the less elevated portion thereof; a fruit-supporting table adjacent the knife; twin belts adjacent the knife, and arranged centrally and longitudinally of the chute, and above the same, to rollingly grip the fruit between the belts and the table, and thus carry it past the knife; and means for driving the belts; said belts being arranged so as to move at such a rate as to carry the fruit at a speed faster than the maximum rate of free rolling down the chute.

CHANNING W. SOUTHER.
HENRY S. FARNSWORTH.